Oct. 5, 1965         A. W. VAN'T SLOT              3,210,557
           DEVICE FOR CHECKING THE PRESENCE OR ABSENCE OF
                  A PLURALITY OF DIRECT CURRENTS
Filed April 28, 1961                         2 Sheets-Sheet 1

INVENTOR
ANTONIE WIJBE VAN'T SLOT
BY
AGENT

United States Patent Office 3,210,557
Patented Oct. 5, 1965

3,210,557
DEVICE FOR CHECKING THE PRESENCE OR ABSENCE OF A PLURALITY OF DIRECT CURRENTS
Antonie Wijbe van 't Slot, Hilversum, Netherlands, assignor to North American Philips Company, Inc., New York, N.Y., a corporation of Delaware
Filed Apr. 28, 1961, Ser. No. 106,214
Claims priority, application Netherlands, May 10, 1960, 251,439
3 Claims. (Cl. 307—88)

The invention relates to a device for checking the presence or the absence of one of a plurality of direct currents. The need for such a device occurs, for example, in large electronic systems, in which a member of bias currents occur. The value of each of these bias currents usually depends only upon the voltage of a D.C. voltage source, which voltage can be checked and kept constant in known manner, irrespective of this invention. The present invention therefore relates only to means for checking for the presence or the absence of bias currents, and not to their magnitudes. The invention has for its object, the provision of a reliable and simple solution of this problem. The device according to the invention is characterized in that the direct currents are divided into pairs. If the number of direct currents is an odd number, one of the direct currents may be assigned to two different pairs. One current of each pair of currents is applied to the setting circuit of a storing pulse generator and the other current of each pair is applied to the firing circuit of the storing pulse generator. Each of these pulse generators is connected so that the simultaneous presence and the simultaneous absence of the two direct currents of one pair are equivalent for the pulse generator concerned. When one of these two direct currents is absent, the pulse generator concerned can not be set, so that it can no longer supply output pulses. Each pulse generator is set at a given instant of pulse cycles by way of a further setting circuit and is fired at a different instant of the pulse cycles by way of a further firing circuit. A storing pulse generator is to be understood to mean herein a circuit having one or more setting circuits and one or more firing circuits, and being arranged so that it supplies an output pulse only when first a current pulse is passed through one of its setting circuits (setting of the pulse generator) and subsequently a current pulse is passed through one of its firing circuits (firing of the pulse generator). A pulse generator not previously set can therefore not supply an output pulse when fired and a fired pulse generator cannot supply another output pulse before it has been reset. Such pulse generators are described for example in United States Patent No. 2,729,808 and in I.R.E. Conventional Record 1955, Nat. Conv. Part 4, page 90, Fig. 3. The setting and firing circuits may be designed so that the pulse generator can be brought into the set condition state by a current pulse of prescribed intensity and can be brought into the fired or non-set condition by a current pulse which may have an intensity differing from that of the former. The setting circuits and firing circuits may furthermore be designed so that the energization of a setting circuit is completely compensated by the energization of a firing circuit and conversely. In this case, a setting circuit and a firing circuit are simultaneously energized, the pulse generator will be in the same condition as in the case when neither the setting circuit nor the firing circuit is energized. In this case, however, the energization of two setting circuits and of only one firing circuit brings the pulse generator into the set condition and the energization of only one setting circuit and of two firing circuits into the fired, i.e. non-set condition, and these set and non-set conditions respectively are maintained until the energization of the pulse generator changes.

Two embodiments of the invention will be described more fully with reference to the drawing.

Figure 1:
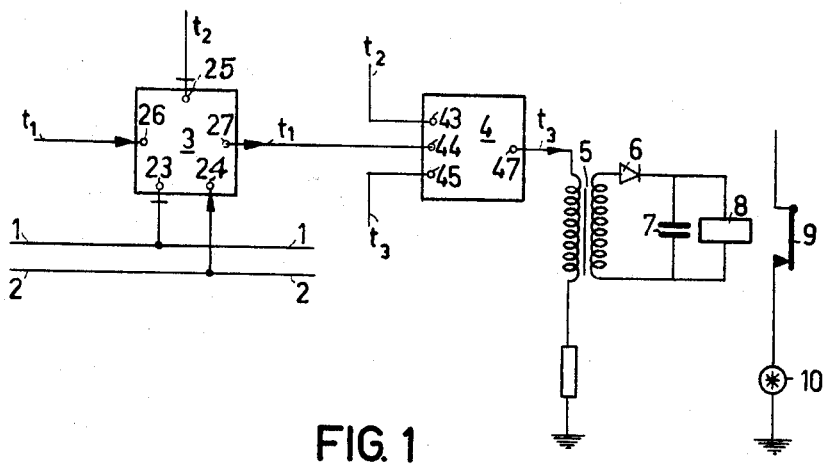
FIG. 1 shows the diagram of a first embodiment of the invention.

FIGURE 1 reference numerals 1 and 2 designate two wires, through which the direct currents to be checked pass, 3 denotes a storing pulse generator having two independent setting circuits with input wires indicated by a transverse dash, and having two independent firing circuits, to which conduct the wires indicated by an arrow directed towards the block representing the storing pulse generator. The direct current passing through the wire 1 also passes through one of the setting circuits of the pulse generator 3 and that the direct current passing through the wire 2 also passes through one of the firing circuits of the pulse generator 3. In FIG. 1 this is shown, for the sake of simplicity, as a parallel connection, but in reality series connections are employed here, since the invention relates to current detection and not to voltage detection. The pulse generator is fired at the instant $t_1$ of the pulse cycles by means of a pulse applied to the second firing circuit, and it is set at the instant $t_2$ of the pulse cycles by means of pulses applied to the second setting circuit. The current pulses required for setting and firing are supplied by a clock pulse generator.

This part of the arrangement operates as follows: when the direct currents are present in both of the wires 1 and 2, the storing pulse generator 3 is in the same state as it is when both of these two currents are absent. Consequently, it is fired at the instant $t_1$ of each pulse cycle and set at the instant $t_2$ of each pulse cycle. The pulse generator 3 supplies at its output terminal 27, in this case, a pulse sequence having pulses occurring at the instant $t_1$ of the pulse cycles.

However, if the current in the wire 1 is absent and current in wire 2 is present, the pulse generator 3 can not be set, since the energization of the second setting circuit at the instant $t_2$ of the pulse cycles is compensated by the constant energization of the first firing circuit by the direct current in the wire 2. The firing at the instant $t_1$ of the pulse cycles has no effect, and the pulse generator 3 thus can not supply output pulses.

If the current in the wire 2 is absent when current in wire 1 is present, the pulse generator 3 can not be fired, since the energization of the second firing circuit at the instant $t_1$ of the pulse cycles is compensated by the constant energization of the first setting circuit by the direct current in the wire 1. The firing at the instant $t_1$ of the pulse cycles is therefore also without any effect and the pulse generator therefore cannot supply output pulses. However, these output pulses re-occur as soon as the disturbed direct current re-occurs.

The output terminal 27 of the pulse generator 3 is connected to a supply terminal 44 of a special pulse gate 4. Clock pulses occurring at the instant $t_2$ of the pulse cycles are supplied to the second supply terminal 43 of this pulse gate and clock pulses occurring at the instant $t_3$ of the pulse cycles are supplied to a third supply terminal 45 of the pulse gate, so that it supplies, at its output terminal 47, a pulse sequence having pulses occurring at the instant $t_3$ of the pulse cycles as long as it receives, at its supply terminal 44, pulses from the pulse generator 3 occurring at the instant $t_1$ of the pulse cycles. Whenever one of the last-mentioned pulses is absent, however, the pulse sequence supplied by the pulse gate 4 is interrupted and does not recur automatically, when the pulse gate receives later pulses from the pulse generator 3. Thus even a temporary absence of the direct current in one of the wires 1 or 2 is indicated by the interruption of the pulse sequence supplied by the pulse gate 4. The last-mentioned pulse sequence is rectified in known manner via a transformer 5, a rectifier 6 and a capacitor 7 and the direct current obtained by this rectification is fed through a relay winding 8 with a break contact 9. The latter contact is included in the circuit of an alarm device 10. An even temporary absence of the direct current in one of the wires 1 or 2 thus causes the closure of the break contact 9 and hence the alarm device 10 becomes operative.

Figure 2:
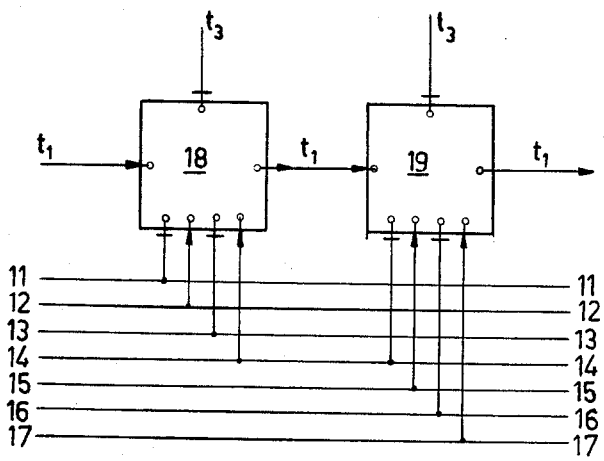
FIG. 2 shows the diagram of part of a second embodiment of the invention.

FIG. 2 illustrates a circuit for checking the direct currents in seven wires 11, 12, 13, 14, 15, 16 and 17. The circuit comprises two storing pulses generators 18 and 19 of the same kind as the pulse generator 3 of FIG. 1, but each of these pulse generators has three independent setting circuits and three independent firing circuits. The seven wires 11 to 17 are arranged in four pairs, i.e. the pairs (11, 12), (13, 14), (14, 15) and (16, 17). Since the number of wires is odd, one of the wires, in this case the wire 14, is assigned to two pairs. Of each pair of wires one wire is included in the setting circuit and the other in a firing circuit of one of the two storing pulse generators 18 and 19. The output terminal of the storing pulse generator 18 is connected to a firing circuit of the storing pulse generator 19. The pulse generator 18 is fired at the instant $t_1$ of the pulse cycles, whereas both pulses generators are set at the instant $t_2$ of the pulse cycles. It is evident that the pulse generator 18 only supplies output pulses occurring at the instant $t_1$ of the pulse cycles, when the wires 11, 12, 13 and 14 are all conveying current and that these pulses are absent when the current in one of these four wires is absent. The pulse generator 19 only supplies output pulses, when it receives pulses at the instant $t_1$ of the pulse cycles, i.e. when the wires 11, 12, 13, 14 are all conveying current and, in addition, also the wires 14, 15, 16, 17 are all conveying current. The absence of the direct current in one of the wires 11 to 17 thus causes the stopping of the output pulses of the pulse generator 19. The last-mentioned pulses may be used in the same manner as is indicated in FIG. 1.

The circuit is a self-checking circuit, since the stopping of a clock pulse or a defect of one of the circuit elements involves the stopping out of the pulses to be rectified and hence the closure of the contact 9.

Figure 3:
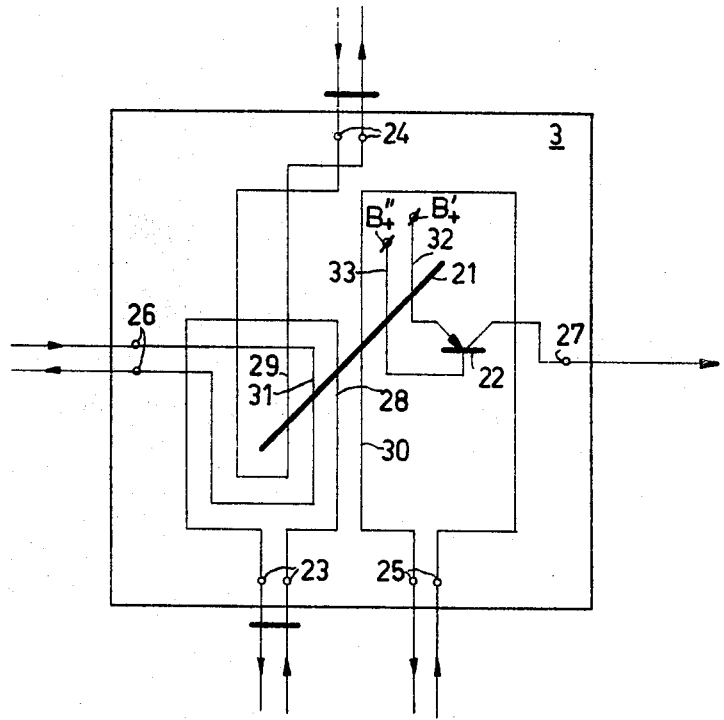
FIG. 3 shows the diagram of a storing pulse generator, of which the storage element is a ring of a material having a rectangular, magnetic hysteresis loop.

FIG. 3 shows a possible embodiment of the storing pulse generator 3, in which the storage element is constituted by an annular core 21 of a material having a rectangular magnetic hysteresis loop. The generator also comprises a current-amplifying and current-regulating transistor 22. The pulses generator comprises two pairs of setting terminals 23 and 24 each of which is connected to a setting winding 28 and 29 respectively of the core 21, two pairs of firing terminals 25 and 26, each of which is connected to a firing winding 30 and 31 respectively of the core 21, and an output terminal 27, which is connected to the collector of a p-n-p-transistor 22. The emitter of this transistor is connected via a feedback winding 32 of the core 21 to a positive voltage source $B_+'$ and the base is connected via a control-winding 33 to a second positive voltage source $B_+''$. The voltage sources $B_+'$ and $B_+''$, which may be a single source, supply such voltages that the transistor is normally non-conductive. The windings are shown all in the form of a wire threaded once through the ring 21, but each of these windings may, of course, have more than one turn. The current directions are indicated in the figure.

The generator 3 operates as follows: Assume that a current pulse is fed to the setting terminals 24. The core 21 then reaches a magnetic state which is termed the position 1. The voltages induced into the control-winding 33 and the feedback winding 32 increases the voltages at the base and the emitter of the transistor 22, but the assembly is proportioned so that this transistor remains in the nonconductive state. If then a current pulse is fed to the firing terminals 26, the core 21 starts changing over to the position 0, so that voltages are induced into the control winding 33 and the feedback winding 32 to render the base of the transistor 22 negative with respect to the emitter. Thus the transistor 22 becomes conductive and the pulse generator supplies an output pulse. Consequently, a current passes through the feedback winding 32, which current supports the effect of the current through the firing winding 31 and, as the case may be, take it over. By a correct proportioning it can be ensured that the pulse generator supplies, during firing, an output pulse with sharply defined amplitude and duration, which is substantially independent of the form of the firing pulse.

It is evident that the operation is not modified in any way when the setting terminals 23 and the firing terminals 25 receive direct currents, since the effects of the currents through the windings 28 and 30 compensate each other completely, at least with a correct choice of the current intensities and the number of turns. If the current to the firing terminals 25 is absent, the core 21 cannot change over to the position 0. When the current to the setting terminals 23 is absent, the ring 21 cannot change over to the position 1. In both cases the pulse generator cannot supply output pulses.

It is furthermore evident that the pulse generator may, as in alternative, be proportioned so that it can be moved into the set condition only when a setting pulse is fed simultaneously to two pairs of setting terminals (setting in coincidence).

Figure 4:
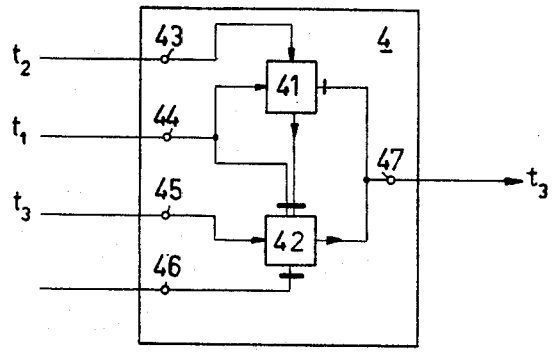
FIG. 4 shows the diagram of a special pulse gate composed of two storing pulse generators.

FIG. 4 shows a potential embodiment of the special pulse gate 4. This gate comprises three supply terminals 43, 44, 45, a special control-terminal 46 and an output terminal 47, which are connected in the manner shown to the firing terminals and the setting terminals of two storing pulse generators 41 and 42. The pulse generator 41 comprises one pair of setting terminals, two pairs of firing terminals and one output terminal. The pulse generator 42 comprises two pairs of coupled setting terminals, one third pair of setting terminals, one pair of firing terminals and one output terminal. The pulse generator 42 is arranged so that it can be set either by feeding simultaneously two current pulses to the two pairs of coupled setting terminals or by feeding one current pulse to the third pair of setting terminals. For the sake of simplicity the figure shows again parallel combinations although in reality series combinations are concerned. The supply terminals 43, 44 and 45 receive pulses at the instants shown in the figure.

This circuit operates as follows. Assuming that the circuit is in the state in which the pulse generator 41 is fired and the pulse generator 42 is set. At the next following instant $t_3$ of the pulse cycles the pulse generator 42 is fired the output pulse produced by generator 42 is the output pulse of the pulse gate as a whole, and is also employed to excite the pulse generator 41. At the next following instant $t_1$ of the pulse cycles the pulse generator 41 is fired and the output pulse produced thereby, together with the firing pulse itself, sets the pulse generator 42 by coincidence. This cycle is repeated as long as the terminals 44 and 45 receive pulses at the instants $t_1$ and $t_3$. The pulses fed to the terminals 43 at the instant $t_2$ of the pulse cycles do not fire the generator, since the pulse generator 41 is in the non-set condition at the said instant. The final result is therefore that the pulse gate supplies a pulse sequence having pulses occurring at the instant $t_3$ of the pulse cycles. However, if one of the pulses to the supply terminal 44 falls out, the pulse generator 41 is not fired at the instant $t_1$ but it is fired at the next-following instant $t_2$. This does not result in that the pulse generator 42 being set, however, since no coincidence takes place at its two pairs of coupled setting terminals. The pulse generators 41 and 42 are then both in the non-set condition and the pulse gate cannot supply output pulses, even if it receives, after some time, pulses at its supply terminal 44. The pulse gate can be reset to the state in which it supplies pulses by setting the pulse generator 42 by feeding a current pulse to the special control-terminal 46, which current pulse should, of course, not occur at the instant $t_3$ of a pulse cycle.

The arrangements shown in FIGS. 3 and 4 are only given by way of example. The invention is, of course, not restricted to the disclosed embodiment of the storing pulse generator and the special pulse gate.

What is claimed is:

1. A circuit for detecting the flow of direct current in first and second current paths, said circuit comprising storing pulse generator means having first and second setting circuits, first and second firing circuits, and an output circuit, means for applying the current of said first path to said first setting circuit, means for applying the current of said second path to said first firing circuit, a source of first and second pulse trains of pulses occurring at different instants, means for applying said first pulse train to said second setting circuit, means for applying said second pulse train to said second firing circuit, the setting and firing circuits of said pulse generator being balanced whereby in the absence of current in said first path and presence of current in said second path said pulse generator cannot be set by said first pulse train, and in the absence of current in said second path and presence of current in said first path said pulse generator cannot be fired by said second pulse train, and output means connected to said output circuit and comprising pulse gate means having at least first and second input terminals and an output terminal, a source of a third pulse train of pulses occurring at instants different than the instants of the pulses of said first and second pulse trains, means connecting said output circuit to said first input terminal, means applying said third pulse train to said second input terminal, said pulse gate means comprising means for passing said third pulse train to said output terminal only when output pulses of said storing pulse generator occur in uninterrupted sequence, and rectifier means connected to said output terminal for providing an output voltage.

2. A circuit for detecting the flow of direct current in first and second current paths, said circuit comprising storing pulse generator means having first and second setting circuits, first and second firing circuits, and an output circuit, means for applying the current of said first path to said first setting circuit, means for applying the current of said second path to said first firing circuit, a source of first and second pulse trains of pulses occurring at different instants, means for applying said first pulse train to said second setting circuit, means for applying said second pulse train to said second firing circuit, the setting and firing circuits of said pulse generator being balanced whereby in the absence of current in said first path and presence of current in said second path said pulse generator cannot be set by said first pulse train, and in the absence of current in said second path and presence of current in said first path said pulse generator cannot be fired by said second pulse train, and output means connected to said output circuit and comprising pulse gate means having first, second, third and fourth input terminals and an output terminal, a source of a third pulse train of pulses occurring at instants different than the instants of the pulses of said first and second pulse trains, means connecting said output circuit to said first input terminal, means applying said first pulse train to said second input terminal, means applying said third pulse train to said third input terminal, said pulse gate means comprising a second storing pulse generator having a third firing circuit connected to said second terminal, a fourth firing circuit connected to said first terminal, a setting circuit connected to said output terminal, and a second output circuit, a third storing pulse generator having third and fourth coupled setting circuits connected to said first terminal and said second output circuits respectively, a firing circuit connected to said third input terminal, an output circuit connected to said output terminal, and a fifth setting circuit connected to said fourth input terminal, a source of reset signals connected to said fourth input terminal, and rectifier means connected to said output terminal for providing an output voltage.

3. A circuit for detecting the flow of direct current in a plurality of current paths, said circuit comprising a plurality of storing pulse generators, each storing pulse generator having a plurality of firing circuits, a plurality of setting circuits, and an output terminal, a source of first and second pulse trains of pulses occurring at different instants, means applying said first pulse train to one firing winding of one pulse generator, means connecting the output circuits of all but the last of said storing pulse generators to one firing circuit of the next adjacent pulse generator, output means connected to the output circuit of said last pulse generator, means applying said second pulse train to one setting terminal of each of said pulse generators, and means connecting the remaining setting and firing circuits of said pulse generators to said current paths whereby each of said remaining circuits of each of said pulse generators are connected to a different current path than the other remaining circuits of the respective pulse generator, the setting and firing circuits of said pulse generators being balanced whereby in the absence of current in one path to which a pulse generator is connected the respective pulse generator cannot be set by pulses applied to the respective said one setting circuit and in the absence of current in another path to which a pulse generator is connected the respective pulse generator cannot be fired by pulses applied to the respective said one firing circuit.

References Cited by the Examiner

UNITED STATES PATENTS

| | | | |
|---|---|---|---|
| 1,287,982 | 12/18 | Hartley | 323—56 X |
| 1,858,037 | 5/32 | Burton | 323—56 X |
| 1,997,657 | 4/35 | Schmutz | 307—88.5.10 |
| 2,882,482 | 4/59 | Simkins | 307—88.5.10 |
| 2,922,899 | 1/60 | Russell | 307—88.5.10 |
| 2,975,408 | 3/61 | Merel | 340—253 |
| 2,987,653 | 6/61 | Prapis | 323—89.1 |
| 3,139,609 | 6/64 | Crane et al. | 340—174 |

IRVING L. SRAGOW, *Primary Examiner.*

BENNETT G. MILLER, *Examiner.*